3,016,406
REACTIONS OF PERFLUOROALKYL IODIDES AND OLEFINS IN THE PRESENCE OF ESTERS
Neal O. Brace, Wilmington, Del., assignor to E. I. du Pont de Nemours and Company, Wilmington, Del., a corporation of Delaware
No Drawing. Filed Sept. 21, 1960, Ser. No. 57,383
6 Claims. (Cl. 260—653)

This invention is directed to the addition of perfluoroalkyl iodides to aliphatic olefins. More particularly, the present invention is concerned with a process comprising thermally initiated addition of polyfluoroalkyl iodides to aliphatic olefins and acetylenes in the presence of an aliphatic ester to give products of structure

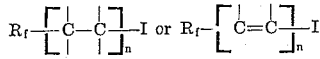

$R_f$ being a polyfluoroalkyl group and $n$ an integer $>0$.

Thermochemical addition of polyfluoroalkyl iodides to olefins or acetylenes is well known. In general, fair yields of the telomer type products

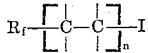

($n=1$, 2, 3 etc.) are obtained. But, in many cases the products are sensitive to elevated temperatures, as are most aliphatic iodides, so yields are poorer than desired due to decomposition reactions. For example, Haszeldine and Steele (J. Chem. Soc., 1199 (1953) heated trifluoromethyl iodide and vinyl chloride for four days at 230–235° C. and obtained 41% conversion of the iodide, a 7.3% yield of the desired product $CF_3CH_2CHCII$ and a 49.4% yield of a decomposition product $CF_3CH_2CH_2Cl$ along with quantities of iodine, iodine chloride and HCl. A number of other examples of this type could be cited. As a general rule, the products

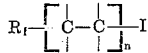

which contain at least one hydrogen attached to the carbon bearing the iodine or the adjacent carbon are unstable thermally. If an activating group, for example —$CO_2CH_3$, is attached to the carbon bearing the iodine, none of the desired product is obtained, the iodine being lost entirely.

It is an object of the present invention to provide a process of modifying the thermal addition of polyfluoroalkyl iodides to aliphatic olefins and acetylenes which process prevents decomposition of the desired products during the reaction.

It is a further object of this invention to provide a novel process for the addition of perfluoroalkyl iodides to aliphatic olefins, the resulting product being obtained in significant yields.

These and other objects will become apparent in the following description and claims.

It has unexpectedly been found that, if the thermal addition of polyfluoroalkyl iodides is carried out in the presence of an aliphatic ester, as described and claimed, the decomposition of the desired iodine containing product is prevented and excellent yields are obtained.

More specifically, the present invention is directed to a process comprising the thermal reaction of polyfluoroalkyl iodides with aliphatic olefins and acetylenes, the improvement in said process comprising the carrying out of the reaction in the presence of aliphatic esters $RCO_2R'$ wherein R is an alkyl group and R' is a primary or secondary alkyl group.

The thermal addition of polyfluoroalkyl iodides is well established. Typical examples of useful iodides are $C_nF_{2n+1}I$ ($n=1$–20 or more), $Cl(CF_2CFCl)_nI$ ($n=1$ or more), $H(CF_2CF_2)_nI$ ($n=1$, 2, 3, etc.), $I(CF_2CF_2)_nI$ ($n=1$, 2, 3, 4 ...), $Cl(CF_2CF_2)_nI$ ($n=1$ or more), $Br(CF_2CF_2)_nI$ ($n=1$ or more). Well-known specific examples are $CF_3I$, $C_2F_5I$, $C_3F_7I$, $C_7F_{15}$ and $CF_2ClCFCII$.

The aliphatic olefins and acetylenes utilized according to the present invention are compounds which do not contain a plurality of halogens although most other substituents are permissible, e.g., —OH, —$CO_2H$ or —$CO_2R$, carbonyl, ether, amido, cyano, aryl, —$O_2CR$ and the like.

In the normal thermal reaction, the polyfluoroalkyl iodide and the olefin or acetylene are heated together, usually at 200–250° C. in a pressure vessel, for a period of time varying from a few hours to several days. The desired products have the structure

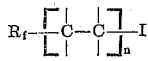

If, however, the product contains the group CHI— or

—CH—CI— it can undergo subsequent reactions. Dehydroiodination occurs readily leading to an olefin, viz.:

The HI may then react with further iodide to form the reduced compound and iodine, viz.:

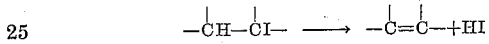

Since the original reaction involves the addition of a free radical, $R_f$·, to the olefin, the presence of iodine is undesirable since it will react with the free radical and stop the reaction, viz.:

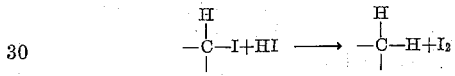

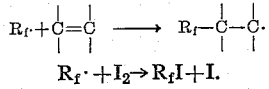

Iodine also probably catalyses the loss of HI from the products. Thus, not only are iodine-free products in the form of olefins or reduced compounds formed by side reactions but also the desired reaction is stopped by the products of the side reactions.

It should also be noted that HI is a strong acid and highly corrosive at the reaction temperatures of 180–220° C. Thus, it was found that severe corrosion of the stainless steel reaction vessel took place when thermal additions of perfluoroalkyl iodides to olefins were carried out at 200–220° in the absence of a carboxylic ester. When a carboxylic ester is present, the amount of HI present is significantly minimized and corrosion is either absent or very minor.

Also, it should be noted that terminal olefins are rearranged to internal olefins during thermal additions without carboxylic ester present, probably due to the HI present. Such acid catalyzed rearrangements are well known. The internal olefins are much less reactive than terminal olefins leading to decreased yields.

In certain cases the normal thermal reaction fails completely. For example, it has been reported that the thermal reaction of $CF_3I$ with vinyl acetate gave only resinous products.

When, according to the present invention, an alkyl ester is included in the thermal reaction of a polyfluoroalkyl iodide with olefins or acetylenes, the side reactions involving the loss of iodine from the product are essentially done away with. This is apparently due to the fact that the side reactions are initiated by the loss of HI from the products, which HI reacts with more product, and the alkyl ester reacts with HI to form an alkyl iodide and a weak acid, i.e., $HI+RCO_2R' \rightarrow RCO_2H+R'I$. Since the concentration of HI is minimized, the side reactions are minimized. The aliphatic organic acid, being much weaker than HI, causes very little corrosion of equipment.

Almost any alkyl ester can be used in the present process. However, since the success of the method depends on R'I itself being stable, R' should not be a group which forms relatively unstable iodides. Thus R' should never be a tertiary alkyl group such as tert. butyl. Preferably R' should be primary group such as methyl, ethyl, propyl, butyl or isobutyl, although secondary groups such as isopropyl and secondary butyl can also be used with some success. Methyl acetate and ethyl acetate are the preferred esters. Longer chain alcohol esters can be used but, if R' contains too many carbons, the iodide R'I which is formed in small amounts may interfere with purification of the desired products.

Preferred iodides utilized according to this invention are of the formula $C_nF_{2n+1}I$, $n$ being of a value from 1 to 10; representative species include $C_3F_7I$, $C_2F_5I$, $C_4F_9I$, $C_5F_{11}I$ and $C_7F_{15}I$.

The following olefin classes are preferred in practicing the present invention: (1) $CH_2=CH(CH_2)_mCO_2R$ wherein R is H or alkyl and $m$ has a value of from 0 to 15; (2) $CH_2=CH(CH_2)_mOR$ wherein R is H or acyl and $m$ is within the range of 0 to 16; (3) $CH_2=CHC_nH_{2n+1}$ wherein $n$ has a value of from 0 to 20; and, (4)

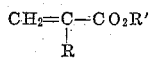

wherein R is H or methyl and R' is H or alkyl.

The following representative examples give a comparison between the normal thermal reaction and the improved process of the present invention.

*Example 1*

A mixture of hexene-1 (42.0 g., 0.50 mole) and n-perfluoropropyl iodide (100 g., 0.33 mole) was placed in a 300-ml. Hastelloy C shaker tube. The mixture was heated at 210° C. for four hours while shaking. The gases were then vented off at 0° C. and the red, fuming liquid product (84 g.) was collected. Solid iodine and a black tar remained in the shaker tube. The liquid product was shaken with saturated sodium thiosulfate solution to remove iodine and dried over calcium sulfate.

Fractional distillation of the liquid product gave perfluoropropyl iodide (3.0 g.), an unknown compound, B.P. 54–55.5° C., $n_D^{20}$ 1.3794 (1.4 g.), hexene-1 (0.9 g.), hexene-2 (2.0 g), a mixture, B.P. 75–127° C.; $CF_3CF_2CF_2(CH_2)_5CH_3$, B.P. 128–131° C. (72°/95 mm.), $n_D^{25}$ 1.3330 (41.2 g.); $CF_3CF_2CF_2CH_2CHI(CH_2)_3CH_3$, B.P. 85–86°/17 mm., $n_D^{25}$ 1.4096 (2.8 g.) other high boiling fractions (9.3 g.) and residue (0.9 g.)

The tar remaining in the shaker tube was extracted with methanol and the methanol solution was washed with saturated sodium thiosulfate and dried. Distillation of the methanol solution gave $CF_3CF_2CF_2(CH_2)_5CH_3$ (4.0 g.) and residue (2.1 g.)

The over-all yield of $C_3F_7(CH_2)_5CH_3$ was 53% based on $C_3F_7I$ consumed.

*Analysis.*—Calc'd for $C_9F_7H_{13}$: C, 42.5; H, 5.1; F, 52.3. Found: C, 42.8; H, 5.5; F, 52.7 (I, nil).

The yield of the desired product, $$CF_3CF_2CF_2CH_2CHI(CH_2)_3CH_3$$

was 2.3%; the conversion of $C_3F_7I$ was 97%.

*Example 2*

A mixture of hexene-1 (12.65 g., 0.15 mole), n-perfluoropropyl iodide (29.6 g., 0.1 mole) and methyl acetate (30 ml.) was heated for one hour at 190° C. in a sealed tube. Distillation of the product gave $C_3F_7I$ (48% recovery, 52% conversion) and $$CF_3(CF_2)_2CH_2CHI(CH_2)_3CH_3$$

(100% yield), B.P. 82°/20 mm., $n_D^{25}$ 1.1330.

*Analysis.*—Calc'd for $C_9F H_{12}I$: C, 28.4; H, 3.2; F, 35.0; I, 33.4. Found: C, 28.8; H, 3.5; F, 35.0; I, 33.1.

The superiority of this process over that of preceding Example 1 should be noted.

*Example 3*

A mixture of hexene-1 (12.65 g., 0.15 mole), n-perfluoropropyl iodide (29.6 g., 0.1 mole) and diethyl ether (30 ml.) was heated for one hour at 190° C. in a sealed tube. Distillation of the product gave $C_3F_7I$ (93.4% recovery, 6.6% conversion), hexene-1 (same recovery). The small amount of product isolated was $$C_3F_7CH_2CHI(CH_2)_3CH_3$$

This example shows that the ester is specific in improving the reaction and that a solvent such as diethyl ether is not useful. The improvement then results from the presence of the ester and not just from a solvent being present.

*Example 4*

A mixture of n-perfluoropropyl iodide (71 g., 0.24 mole), allyl acetate (33.0 g., 0.33 mole) and ethyl acetate (70 g.) was heated in a shaker tube for 6 hours at 200° C. The product (170 g.) was combined with 30 g. of ethyl acetate rinse and distilled giving $C_3F_7I$ (1.3 g.); a mixture, B.P. 60–74° (9.2 g.); ethyl acetate (ca. 100 g.); a mixture, B.P. 20–63°/11 mm., $n_D^{25}$ 1.3772 (8.2 g.); $CF_3CF_2CF_2CH_2CHICH_2O_2OCH_3$, B.P. 84–88°/11 mm., 71.4/5.0 mm., $n_D^{25}$ 1.4009 (73.6 g.) and residue (2.9 g.). Conversion was 77% and the yield of desired product $C_3F_7CH_2CHICH_2O_2CCH_3$ was 88%.

*Analysis.*—Calc'd for $C_8H_8F_7O_2I$: C, 24.2; H, 2.0; F, 33.6; I, 32.1. Found: C, 24.8; H, 2.3; F, 34.4; I, 32.0.

*Example 5*

A mixture of n-perfluoropropyl iodide (0.35 mole), 10-undecenoic acid (0.33 mole) and ethyl acetate (90 g.) was heated for 6 hours at 200° C. in a shaker tube. Distillation gave unreacted $C_3F_7I$ and $$CF_3CF_2CF_2CH_2CHI(CH_2)_8CO_2H$$

B.P. 100–130°/0.6–2.0 mm., $n_D^{25}$ 1.4230 (57% conversion, 80% yield).

*Analysis.*—Calc'd: I, 26.4. Found: I, 15.7.

A small amount of $C_3F_7(CH_2)_{10}CO_2C_2H_5$ was also obtained, total over-all yield 85%.

The product (127 g.), was reduced by heating with a mixture of zinc, ethanol and hydrogen chloride. After drowning in water, neutralization and extraction into ether, the product was distilled giving 92 g. of $$CF_3CF_2CF_2(CH_2)_{10}CO_2C_2H_5$$

B.P. 143–152°/10 mm., $n_D^{25}$ 1.4009 to 1.3883; 28.2 g. of a high boiling product and 5.4 g. of residue, over-all yield to reduced ester was 98% of the $C_3F_7I$ theory.

Anlaysis of $CF_3(CF_2)_2(CH_2)_{10}CO_2C_2H_5$.—Calc'd for $C_{16}H_{25}F_7O_2$: C, 50.3; H, 6.6; F, 34.8. Found: C, 50.0; H, 6.5; F, 34.9.

The ester $C_3F_7(CH_2)_{10}CO_2C_2H_5$ (48 g.) in a solution of potassium hydroxide (8.0 g.) in 90 ml. of 90% ethanol at 50° C. for one hour gave the acid $$C_3F_7(CH_2)_{10}CO_2H$$

(39.6 g.), M.P. 48–48.5° C.

*Analysis.*—Calc'd for $C_{14}H_{21}F_7O_2$: C, 47.4; H, 6.0; F, 37.5; neut. equiv. 354. Found: C, 47.4; H, 6.0; F, 39.1; neut. equiv. 350.

Other products which have been prepared by this same series of reactions are $C_2F_5CH_2CHI(CH_2)_8CO_2H$, oil
$C_2F_5(CH_2)_{10}CO_2H$, M.P. 49–50° C.
$CF_3(CF_2)_3CH_2CHI(CH_2)_8CO_2H$, B.P. 118–133°/0.4 mm.
$C_4F_9(CH_2)_{10}CO_2H$, M.P. 55° C.
$CF_3(CF_2)_4CH_2CHI(CH_2)_8CO_2H$, oil
$C_5F_{11}(CH_2)_{10}CO_2H$, M.P. 58–59.8° C.
$CF_3(CF_2)_6CH_2CHI(CH_2)_8CO_2C_2H_5$, B.P. 136° C./0.2 mm.
$C_7F_{15}(CH_2)_{10}CO_2H$, M.P. 82–83° C.
$C_3F_7CH_2CHI(CH_2)_9O_2CCH_3$, B.P. 122°/0.25 mm.
$C_7F_{15}CH_2CHI(CH_2)_3CO_2H$, oil
$C_7F_{15}(CH_2)_5CO_2H$, M.P. 63.8–64.8° C.
$C_7F_{15}CH_2CHICO_2CH_3$, oil

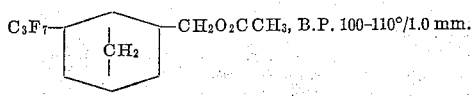, B.P. 100–110°/1.0 mm.

When example 5 was carried out in the absence of an ester, the product was entirely a mixture of $$C_3F_7CH=CH(CH_2)_8CO_2H$$

and $C_3F_7(CH_2)_{10}CO_2H$, none of the iodo acid $$C_3F_7CH_2CHI(CH_2)_8CO_2H$$

was found and the conversion to these products was only 35% at a 65% yield on $C_3F_7I$. The unconverted olefin was entirely rearranged to $CH_3CH=CH(CH_2)_7CO_2H$ which cannot be recycled.

It is readily apparent from the preceding examples, that the improvement in yield of desired product is highly significant when the reaction is carried out in the presence of an ester. Thus, the improved process of the present invention represents a distinct advancement in the art.

The products produced according to the present invention are highly useful. The acids $$R_fCH_2CHI(CH_2)_mCO_2H$$

where $R_f$ is a polyfluoroalkyl group and $m$ is an integer between 5 and about 15 are excellent surface-active agents. The reduced acids $R_f(CH_2)_{m+2}CO_2H$ are also excellent surface-active agents. Such acids have been discussed in Australian application 38940 (June 24, 1958) and Canadian Patent 589,703 (December 29, 1959). La Fleur (U.S. Patent 2,904,571; September 15, 1959) has shown that Werner type complexes of these acids with Chromium (III) are valuable oil-repellent compositions.

Any of the heretofore-described polyfluoroalkyl iodides, aliphatic olefins and acetylenes may be utilized in the preceding examples to give substantially the same results, such modifications and variances as may be necessary are well within the scope of one skilled in the art.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In the process of thermally reacting polyfluoroalkyl iodides with aliphatic olefins and acetylenes, the improvement wherein said reaction is carried out in the presence of aliphatic esters having the structure $RCO_2R'$ wherein R is an alkyl group and R' is selected from the group consisting of primary and secondary alkyl groups.

2. The process of claim 1 wherein the aliphatic ester is $CH_3CO_2CH_3$.

3. The process of claim 1 wherein the aliphatic ester is $CH_3CO_2C_2H_5$.

4. The process of claim 1 wherein the polyfluoroalkyl iodide is $CF_3(CF_2)_nI$ wherein $n$ is an integer from 1 to 10.

5. The process of claim 1 wherein the aliphatic olefin has the structure $CH_2=CHC_nH_{2n+1}$ wherein $n$ is an integer from 0 to about 20.

6. The process of claim 1 wherein the aliphatic olefin is $CH_2=CH(CH_2)_mCO_2R$ wherein R is selected from the group consisting of hydrogen and methyl and $m$ is an integer from 0 to 15.

No references cited.